Oct. 19, 1943.                C. T. BUTTON                2,331,960
              SPEED CONTROL FOR DIRECT CURRENT MOTORS
                      Filed Jan. 21, 1942
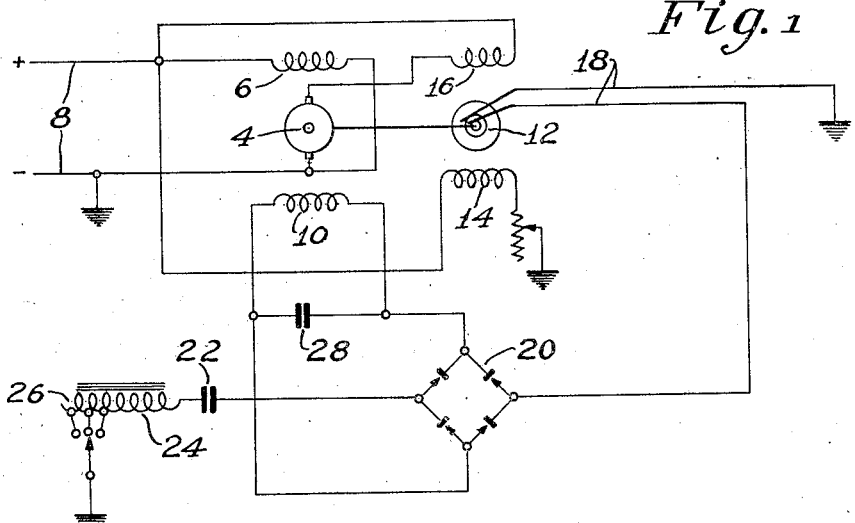
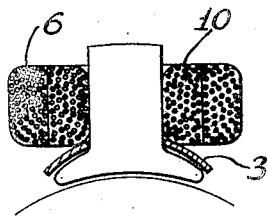
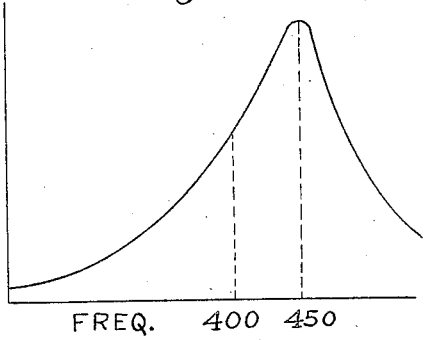
Witness
Charles T. Olson
Inventor
Charles T. Button
by his attorneys Patented Oct. 19, 1943

2,331,960

UNITED STATES PATENT OFFICE 2,331,960

SPEED CONTROL FOR DIRECT CURRENT MOTORS

Charles T. Button, Needham, Mass., assignor to The Holtzer-Cabot Electric Company, Roxbury, Mass., a corporation of Massachusetts Application January 21, 1942, Serial No. 427,616

1 Claim. (Cl. 172—239)

The present invention relates to speed controls for direct current motors.

The object of the invention is to provide a simple, reliable and stable speed control for direct current drives whereby the speed may be regulated within close limits.

With these objects in view, the principal feature of the invention comprises a direct current motor, means for generating an alternating voltage at a frequency dependent on the speed of the motor, a resonant circuit to which alternating current is supplied, and means for supplying a rectified current to a field winding of the motor. As will be subsequently described in detail, the motor regulates at a speed corresponding to a frequency somewhat below the resonant frequency of the resonant circuit. Any slight change of speed from the regulated value results in relatively large compensating change in the motor field current. The motor is thus maintained stably at its proper speed. The system may be used in conjunction with direct current drives of any type.

Other features of the invention comprise certain novel features of construction and combinations and arrangements of parts hereinafter described and particularly defined in the claim.

In the accompanying drawing, Fig. 1 is a diagram illustrating the preferred embodiment of the invention; Fig. 2 is a detail view of the field coils; and Fig. 3 is a diagram illustrating the operation of the system.

The system shown in Fig. 1 comprises a direct current motor having an armature diagrammatically indicated at 4, and a shunt field winding 6, both energized from direct current lines indicated at 8. The motor is provided with an additional field winding 10, which is used for purposes of speed control as will be described later.

The motor is herein shown as driving an alternating current generator, the armature of which is indicated at 12. The generator has a shunt field 14, and is here shown as provided with an auxiliary field 16, in series with the armature 4 of the direct current motor. The auxiliary field 6 is used to increase the field excitation of the generator when the load increases, whereby the alternating voltage may be maintained substantially constant.

The armature 12 may be used only as a means for generating an alternating control voltage of definite frequency, which is proportional to the speed. Although the generator is here shown as a separate unit, the alternating current winding may be formed as a separate winding on the motor armature, or a single winding may be used with appropriate connections for operation as a rotary converter. In any event, an alternating voltage is taken off by slip-rings connected with alternating current lines 18. These lines may be connected to any alternating current load, if the purpose of the system is to generate alternating current at a substantially fixed frequency. If the motor is used to drive a mechanical load, it is only necessary that the means for generating alternating current be of sufficient size to energize the control circuit presently to be described.

The output of the generator 12 is connected through a full wave rectifier 20, the field winding 10 of the direct current motor, and a resonant circuit designated as a condenser 22 and an inductance 24, the latter being provided with taps 26 for adjustment of the resonant frequency. The rectifier 20 is preferably of the dry-plate type and comprises four arms connected in the familiar bridge circuit herein shown. It will be understood that any other type of full wave rectifier may be employed.

To smooth out the pulsations in field current, a filter circuit of any desired form may be connected between the rectifier and the winding 10. A condenser, as indicated at 28, if of sufficient capacity, has been found to provide adequate filter action. In place of or in addition to the condenser 28, it is preferable to provide means for smoothing out the pulsations in the magnetic flux. This is conveniently accomplished by means of a copper ring 30 mounted on the pole pieces, as indicated in Fig. 2. The ring acts as a damper winding or short-circuited secondary, which largely eliminates the pulsations in the magnetic field. The field coils 6 and 10 are indicated in Fig. 2, the coil 10 being preferably the inner coil so that the resistance in the resonant circuit is kept as low as possible. The coils 6 and 10 may be wound on separate poles, in which case damper rings would be required only for the coils 10.

The operation of the system is as follows: The current in the field winding 10 is plotted against frequency in Fig. 3. This diagram indicates approximately the conditions for a regulated motor speed to generate a frequency of 400 cycles per second. The resonant circuit, which includes the inductance 24 and the condenser 22, is tuned so that its peak occurs at a frequency somewhat higher than the regulated frequency. In Fig. 3, the peak frequency is indicated as 450 cycles, so that the regulated frequency is on the steep part of the characteristic below the resonant frequency.

Assuming that the system has been running at 400 cycles, a change of speed brought about from any cause, as for example a change in load, will result in a corresponding momentary change in frequency. If the speed increases, the frequency increases; as shown in Fig. 3, this increases the current through the field winding 10. Likewise, a reduction of speed brings about a reduction of field current. In either case, the change in field excitation is in the proper direction to maintain the speed at its proper value.

Owing to the characteristics of the resonant circuit, a slight change of speed produces a considerable change in field excitation. It will be understood that the present invention affords important advantages over contact-making governors and similar devices, which operate by changing abruptly from one condition to another, and which therefore introduce undesirable hunting. According to the present invention, any slight change in speed results in an immediate and relatively large compensating change in field current. Thus the system is maintained accurately at the proper speed, with exceptional stability, and with little or no hunting, even under sudden changes of load.

The sensitivity of the control is determined by the slope of the characteristic of Fig. 3, and also by the relative strengths of the field windings 6 and 10. If the winding 10 were used alone, the sensitivity would be a maximum and the system would operate most closely at the regulated speed. However, the shunt field winding 6 is used to provide starting torque for the motor, and it also serves to reduce the load on the rectifier 20 and resonant circuit. Although this results in some loss in sensitivity, it has been found that adequate speed control can be obtained, even when a considerable proportion of the field excitation is furnished by the winding 6. In most instances it has been found satisfactory for the winding 6 to carry about 50% of the field excitation.

When the system is used to generate alternating current which is supplied to a load circuit, the frequency may be dictated by the load conditions. However, it is preferred, whenever the frequency is a matter of choice, to use a moderately high frequency such as the 400-cycle frequency mentioned herein, so that the resonant circuit may be made up of elements of small size. This can always be done if the motor is used only to drive a mechanical load and the alternating current is generated only for purposes of speed control, and may frequently be done in cases where alternating current is to be supplied to an electrical load. It will be understood that the generator 18 may be provided with polyphase windings, without affecting the speed-control herein shown.

It will be understood that the invention is not limited to the embodiments herein described and claimed, but may be modified within the scope of the appended claim.

Having thus described my invention, I claim:

In combination with a direct current motor, an alternating voltage source operated by the motor for generating an alternating voltage at a frequency proportional to the motor speed, two field windings for the direct current motor, means for normally exciting one of the field windings, means for exciting the other field winding by rectified alternating current including a series-resonant circuit and rectifier means connected in series to said source, said other field winding being connected with the rectifier means to augment the field of the first winding, and to regulate the motor at a speed at which the frequency of the alternating voltage is below the resonant frequency of the resonant circuit.

CHARLES T. BUTTON.